United States Patent
Roizin et al.

(10) Patent No.: US 11,231,510 B1
(45) Date of Patent: Jan. 25, 2022

(54) RADIATION SENSOR

(71) Applicant: Tower Semiconductor Ltd., Migdal Haemek (IL)

(72) Inventors: Yakov Roizin, Afula (IL); Pikhay Evgeny, Haifa (IL)

(73) Assignee: Tower Semiconductor Ltd., Migdal Hamaek (IL)

( * ) Notice: Subject to any disclaimer, the term of this patent is extended or adjusted under 35 U.S.C. 154(b) by 0 days.

(21) Appl. No.: 16/948,169

(22) Filed: Sep. 4, 2020

Related U.S. Application Data

(63) Continuation-in-part of application No. 16/947,004, filed on Jul. 14, 2020.

(51) Int. Cl.
*G01T 1/24* (2006.01)

(52) U.S. Cl.
CPC .............. *G01T 1/243* (2013.01); *G01T 1/244* (2013.01); *G01T 1/247* (2013.01)

(58) Field of Classification Search
None
See application file for complete search history.

(56) References Cited

U.S. PATENT DOCUMENTS

| | | | | |
|---|---|---|---|---|
| 3,786,264 A | * | 1/1974 | Ferro | H01L 27/1443 250/214 R |
| 4,032,801 A | * | 6/1977 | Fulkerson | G01J 1/16 327/63 |
| 5,166,819 A | * | 11/1992 | Eichel | H03F 3/08 250/214 A |
| 2003/0016084 A1 | * | 1/2003 | Scott | H03F 3/08 330/308 |
| 2012/0211639 A1 | * | 8/2012 | Yasukawa | G01J 1/44 250/206 |

* cited by examiner

*Primary Examiner* — Edwin C Gunberg
(74) *Attorney, Agent, or Firm* — Reches Patents

(57) ABSTRACT

A radiation sensor that may include a first transistor, a first isolated conductive structure that comprises a floating gate of the first transistor, a first group of radiation sensing diodes that are coupled to each other, wherein the first group is configured to convert sensed radiation that is sensed by the first group to a first output signal, and to change a state of the first isolated conductive structure using the first output signal, a second transistor, a second isolated conductive structure that comprises a floating gate of the second transistor, and a second group of radiation sensing diodes that are coupled to each other, wherein the second group is configured to convert sensed radiation that is sensed by the second group to a second output signal, and to change a state, under a control of the first transistor, of the second isolated conductive structure using the second output signal.

22 Claims, 5 Drawing Sheets

RADIATION SENSOR

This application is a continuation in part of U.S. patent application Ser. No. 16/947,004 filing date Jul. 13, 2020 which is incorporated herein by reference.

BACKGROUND OF THE INVENTION

Radiation sensors usually require to be coupled to an external power source in order to operate.

The external power source may increase the cost and the size of the radiation sensor, and may not be available in some cases.

There is a growing need to provide a radiation sensor that may operate without an external power source.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
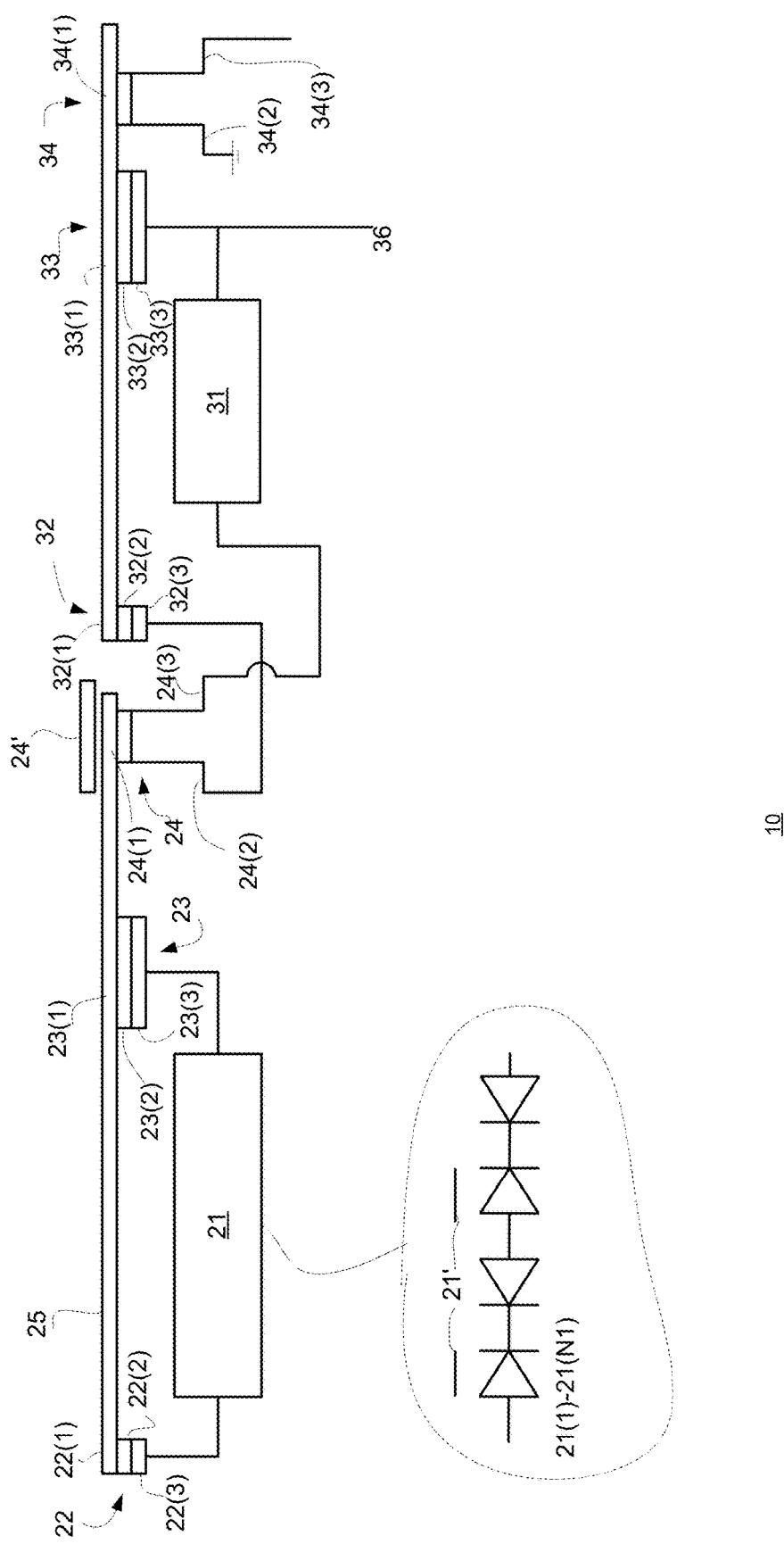
FIG. 1 is an example of a radiation sensor.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

There may be provided radiation sensors that are powered by radiation and program one or more floating conductive structures.

Such radiation sensors may be used in a variety of applications—including but not limited to:

a. Allowing a recipient of a packaged item to learn if the package and especially the radiation sensor within the package was exposed to radiation—for example opened, screened by x-ray radiation, and the like.

b. Monitoring access to a location that—when the access (for example entering a dark room) exposes a radiation sensor within the location to radiation.

c. Monitoring tampering attempts that involve illuminating an item (for example a memory chip) with radiation.

There is provided a radiation sensor that may be manufactured by using fabrication processes that can be easily integrated into standard process flows (e.g., established CMOS, or MEMS process flows) without requiring any (or requiring very few) additional masks. For example, in one embodiment radiation sensing diodes may be formed on a polycrystalline silicon layer typically formed on silicon dioxide insulation layers of thick field oxide or standard shallow trench isolation (STI) in CMOS process flows. Yet for another example—the radiation sensing diodes may be formed in silicon device layer on the buried oxide (BOX) layer—using standard SOI manufacturing processes.

There may be provided a radiation sensor that may sense radiation without reaching a saturation level. Reaching the saturation level may only indicate that the radiation dose exceeded a predefined level—but does not indicate the exact amount of radiation.

Additionally or alternatively—the radiation sensor may virtually not leak, may store information for a long time, and may be generated using a cost effective process—that does not require to manufacture a floating gate made of two layers of polysilicon.

A state of an isolated conductive structure or a floating gate of the isolated conductive structure may refer to the amount of charge stored in the isolated conductive structure or in the floating gate. The state may be changed by charging or discharging—for example using the Fowler-Nordheim programming. Any reference to a charge operation may be applied mutatis mutandis to discharge operation.

FIG. 1 illustrate an example of a radiation sensor 10.

Figure 2:
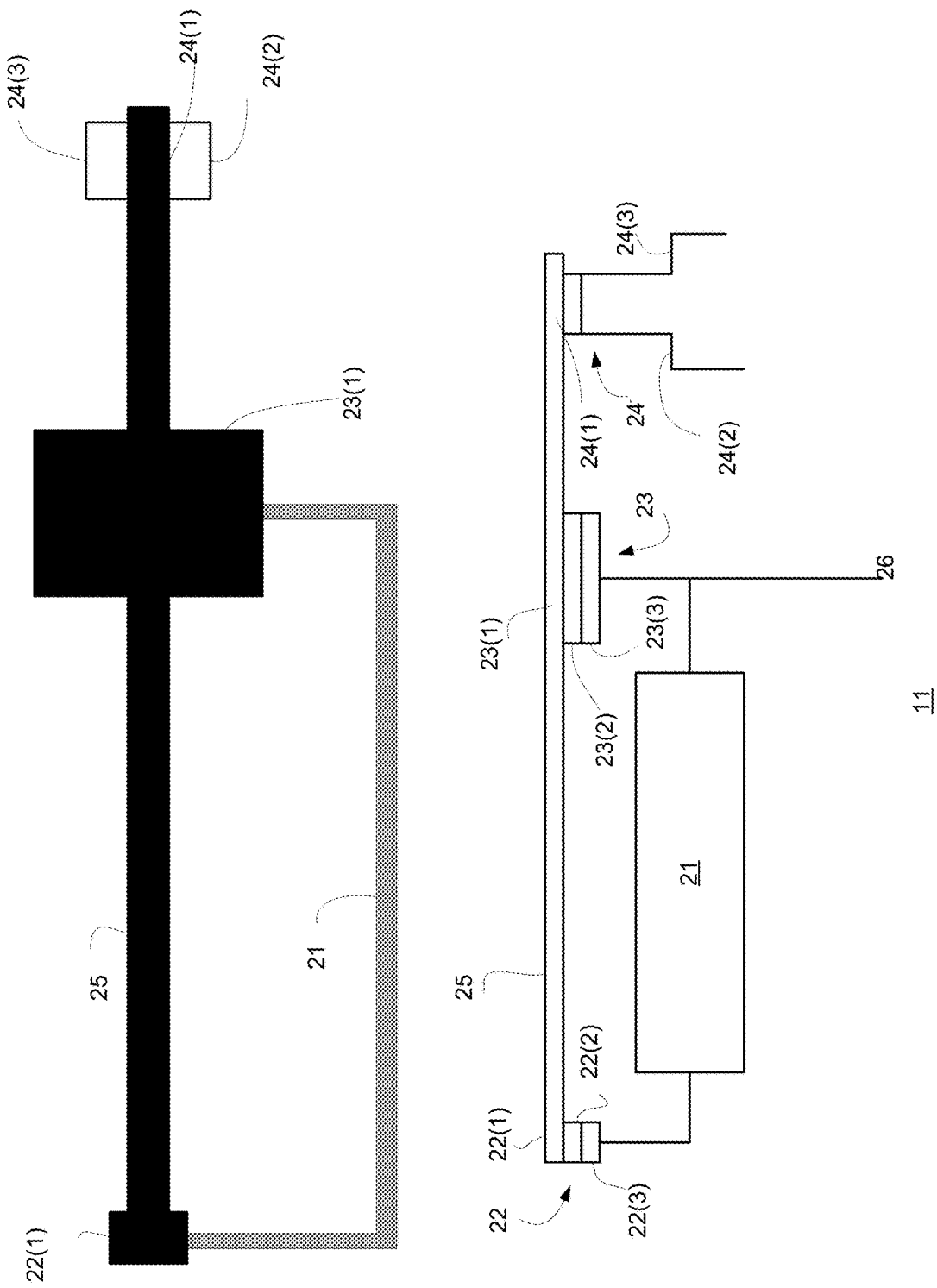
FIG. 2 is an example of a radiation sensor.

FIG. 2 is a top view and a schematic view of a radiation sensor 11. The radiation sensor may belong to radiation sensor 10 or may be a stand-alone radiation sensor.

Figure 3:
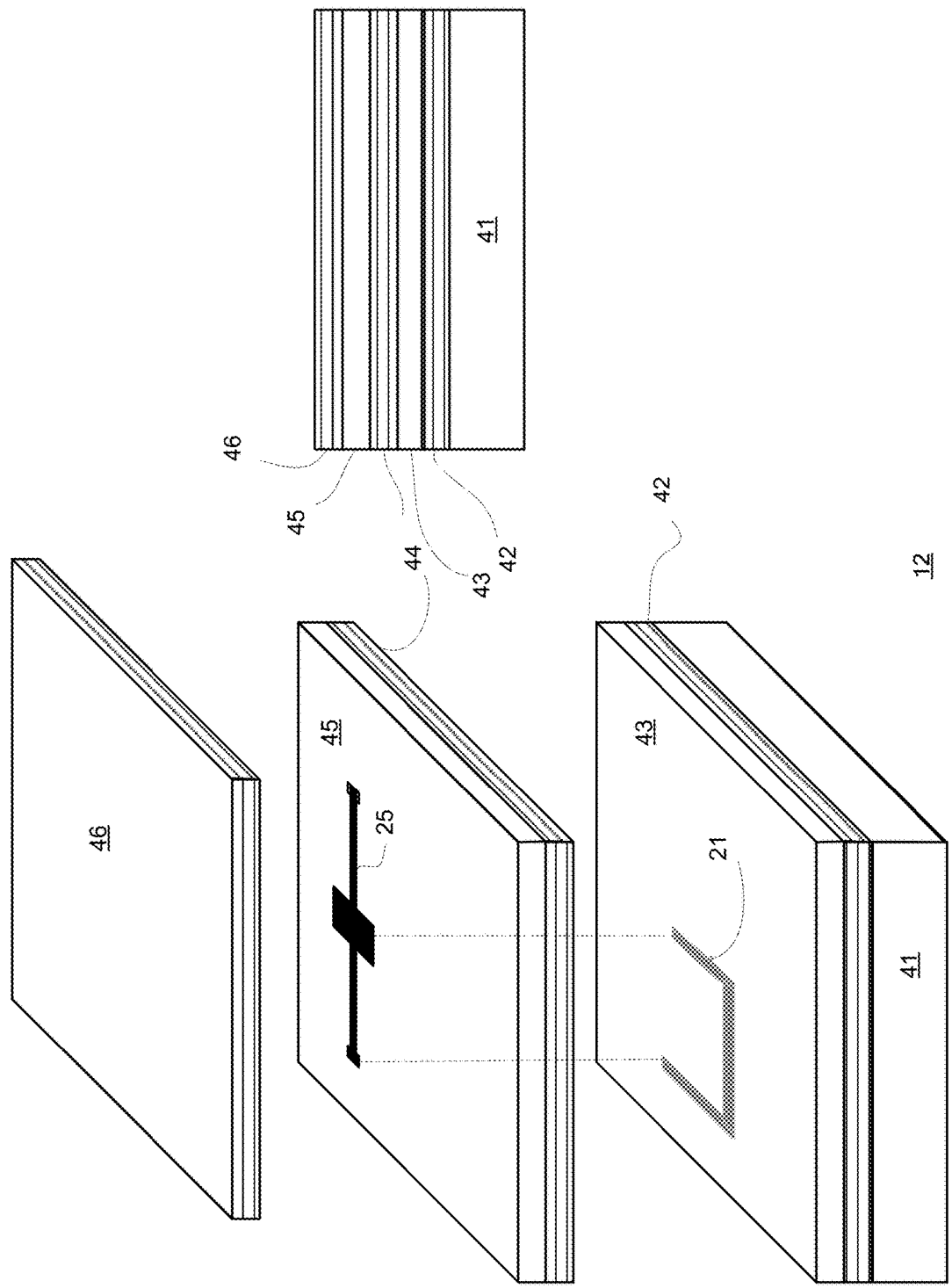
FIG. 3 is an example of a radiation sensor.

FIG. 3 illustrates a partial exploded view and a cross section view taken along different planes of a radiation sensor.

Radiation sensor 10, that includes a first transistor 24, a first isolated conductive structure 25 that includes a floating gate 24(1) of the first transistor, a first group 21 of radiation sensing diodes that are coupled to each other, a second transistor 34, a second isolated conductive structure 35 that comprises a floating gate 34(1) of the second transistor 34, a second group 31 of radiation sensing diodes that are coupled to each other.

The second group 31 of radiation sensing diodes may include any arrangement (one or more sequences) of diodes illustrated in U.S. patent application Ser. No. 16/947,004 filing date Jul. 13, 2020 which is incorporated herein by reference. The same applies to the first group 21 of radiation sensing diodes. See—for example set of group of serially connected photovoltaic diodes of alternating polarities 21(1)-21(N1), in which odd photovoltaic diodes are preceded by radiation blocking elements. N1 being a positive integer. The radiation blocking elements are not shown in FIG. 2 for convenience of explanation.

The first group 21 of radiation sensing diodes is configured to convert sensed radiation that is sensed by the first group 21 to a first output signal, and to change a state of (by utilizing Fowler-Nordheim tunneling) the first isolated conductive structure 25 using the first output signal.

The second group 31 of radiation sensing diodes is configured to convert sensed radiation that is sensed by the second group 31 to a second output signal, and to change a state (by utilizing Fowler-Nordheim tunneling), and under a control of the first transistor 24, of the second isolated conductive structure using the second output signal.

The first transistor 24 controls the changing of state of the second isolated conductive structure. For example—the first transistor may be configured to prevent the second isolated conductive structure 34 to reach a saturation level.

For example—the first group 21 of radiation sensing diodes may charge the first isolated conductive structure when sensing radiation—while the second group 22 of radiation sensing diodes may discharge the second isolated conductive structure when sensing radiation.

The first output signal may be stronger than the second output signal—for the first output signal may have a magnitude that has an absolute value that exceeds an absolute value of a magnitude of the second output signal.

The stronger first output signal may cause the first isolated conductive structure 25 to reach a saturation level—when exposed to large dose of radiation. The value of the large dose may be predetermined and may be determined based on the characters of the first isolated conductive structure.

The first isolated conductive structure 25 may reach a saturation level before the second output signal causes the second isolated conductive structure 35 to reach the saturation level.

The stronger first output signal may deactivate the first transistor 24 before the second isolated conductive structure 35 reaches the saturation level.

The first transistor 24 may be a depletion mode transistor that is open when its gate does not receive any signal—whereas an increment in the charge of the first isolated conductive structure 25 reduces the conductivity of the first transistor 24—until the first transistor 24 closes—and prevents the second group 31 of radiation sensing diodes from charging the second isolated conductive structure 35.

Due to the differences between the first output signal and the second output signal—this occurs before the second isolated conductive structure 35 reaches the saturation level—so that the charge of the second isolated conductive structure 35 reflects the radiation sensed by the second group 31 of radiation sensing diodes.

FIG. 1 also illustrates a first tunneling capacitor (TC) 22, a first control capacitor (CC) 23, a first control gate 25, a second TC 32, a second CC 33, and a second control gate 35.

First transistor 24 has a first floating gate 24(1), a first source 24(2), and a first drain 24(3).

Second transistor 34 has a second floating gate 34(1), a second source 34(2), and a second drain 34(3).

First TC 22 that has a first upper TC plate 22(1) formed in the first isolated conductive structure 25, a first TC dielectric layer 22(2), and a first lower TC plate 22(3) formed in another layer (may be referred to as a device layer).

Second TC 32 that has a second upper TC plate 32(1) formed in the second isolated conductive structure 35, a second TC dielectric layer 32(2), and a second lower TC plate 32(3) formed in another layer (may be referred to as the device layer).

Second lower TC plate 34(3) is coupled to the source 24(2) of the first transistor 24.

A first end of first group 21 is coupled to first lower TC plate 22(3).

A second end of first group 21 is coupled to first lower plate 23(3) of first CC 23.

A first end of second group 31 is coupled to first drain 24(3).

A second end of second group 31 is coupled to second control gate 35 and to second lower plate 33(2) of second CC 33.

The second control gate 35 may be used to program the second isolated conductive structure 35. For example—the second isolated conductive structure 35 may be charged or discharged using a write signal from the second control gate. The second isolated conductive structure 35 may be discharged or charged in response to the radiation sensed by the second group.

The second isolated conductive structure 35 may be read (be sensing the state of the second isolated conductive structure 35) using the second transistor 34.

The floating gate of the first transistor and/or of the second transistor may be made of a single polysilicon layer—which is simpler and cheaper to implement than a double polysilicon floating gate—for example the double polysilicon floating gate of U.S. Pat. No. 8,659,061. Furthermore—the radiation sensing diodes of the first and second groups may be formed in the same single polysilicon layer or in the device layer of SOI. They are not shunted by leakage between P wells and the substrate. In addition—each group of radiation sensing diodes charge or discharge a single capacitor—which is much more effective than charging different capacitors.

The first transistor 24 may be protected from radiation—for example by providing an optical blocking element downstream to the first transistor—for example the blocking element 24' of FIG. 1 could be made from one of metallization metals. This prevents the first transistor to be opened due to the radiation impinging on the first transistor—which may cause the first transistor to leak (remain partially open) even when it should be closed.

As indicated above—each one of the groups of the radiation sensing diodes may be arranged in any of the manners illustrated in U.S. patent application Ser. No. 16/947,004 filing date Jul. 13, 2020 which is incorporated herein by reference which belongs to the same applicant as the current application.

For example—the first group of radiation sensing diodes may be serially connected radiation sensing diodes of alternating polarities—with radiation blocking elements formed downstream to only odd (or even) radiation sensing diodes. The first group of radiation sensing diodes may comprise multiple sequences of (a) a P+ doped region, (b) an intrinsic region, and (c) an N+ doped region.

The first and second groups of radiation sensing diodes may sense any radiation of any frequency range—for example ultraviolet radiation (or only a part of the ultraviolet spectrum), infrared radiation (or only a part of the infrared spectrum), x-ray radiation (or only a part of the x-ray spectrum), and the like.

The first group 21 of radiation sensing diodes and the second group 31 of radiation sensing diodes may be located at a certain layer (for example a device layer) of the radiation sensor. The first isolated conductive structure 25, and the second isolated conductive structure 35 may be located at another layer of the radiation sensor.

FIG. 2 illustrates that the first isolated conductive structure 25 is located to the side of the first group 21. In practice, the first isolated conductive structure 25 and the first group 21 are located at different layers of the radiation sensor 11.

FIG. 2 also illustrates a first control gate 26 connected to a second end of first group 21 and to the first lower plate 23(3) of CC 23. This allows to program the first isolated conductive structure 25.

FIG. 3 illustrates a radiation sensor 40 that includes (from top to bottom):
  a. One or more top layers 46 (such as dielectrics, metal, and the like).
  b. A first layer 45 that includes first isolated conductive structure 25 that may be a single poly silicon layer.
  c. First insulating layer 44 (in which the dielectric layers of first CC 23 and first TC 22 may be formed.
  d. A silicon layer (or a device layer) 43 that may include first group 21 of radiation sensing diodes.
  e. Oxide layer 42 such as a BOX layer.
  f. Silicon substrate 41.

The first layer 45 may also include second isolated conductive structure 55.

The device layer may also include first group 21 of radiation sensing diodes, parts of first and second transistors, and the like.

Figure 4:
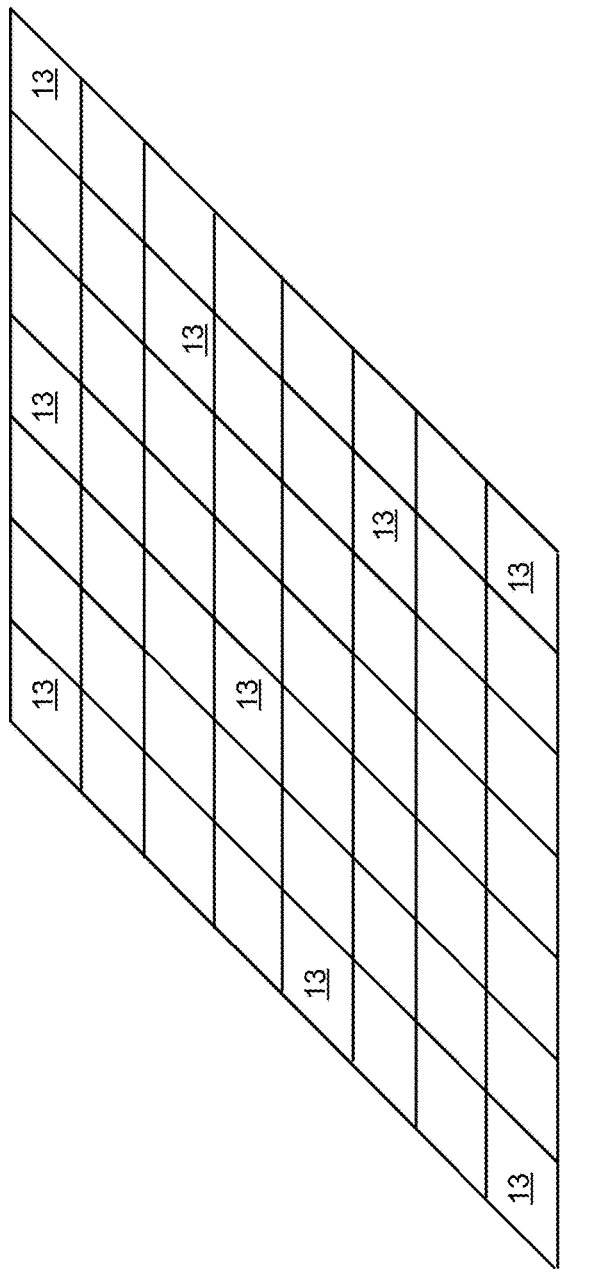
FIG. 4 is an example of a radiation sensor.
Figure 5:
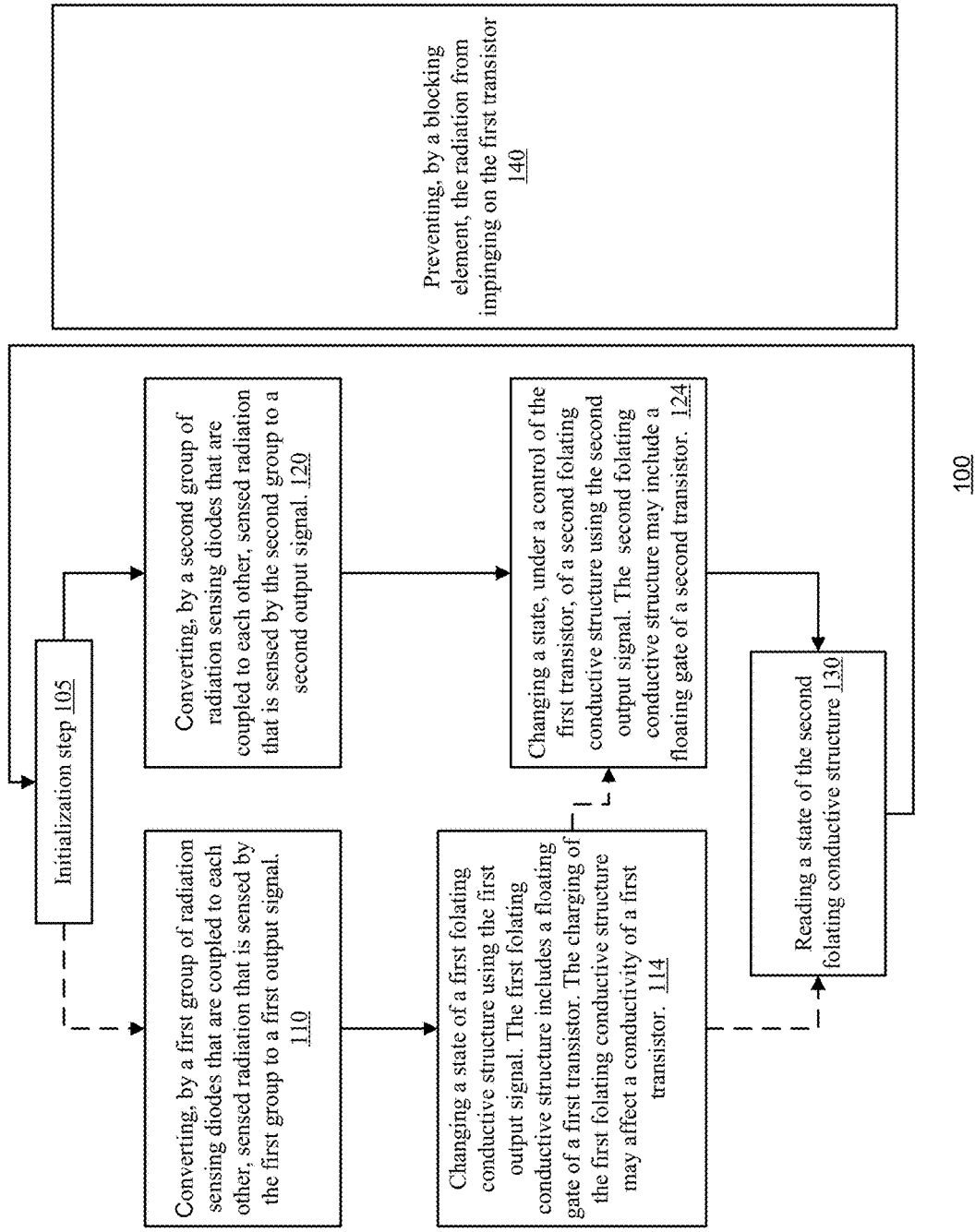
FIG. 5 is an example of a method.

It should be noted that FIGS. 1-3 illustrates a single sensing element—and that the radiation sensor 12 may include multiple sensing elements—as illustrated in FIG. 4. The multiple sensing elements 13 may be arranged in any manner—ordered, non-ordered, grid, one dimensional, two dimensional, and the like.

Having multiple sensing elements may allow to acquire an image—thereby using the radiation sensor as an image sensor.

FIG. 4 is an example of a method 100 for sensing radiation.

Method 100 may start by steps 110 and 120

Step 110 may include converting, by a first group of radiation sensing diodes that are coupled to each other, sensed radiation that is sensed by the first group to a first output signal.

Step 110 may be followed by step 114.

Step 114 may include changing a state of a first isolated conductive structure using the first output signal. The first isolated conductive structure includes a floating gate of a first transistor.

The changing a state of the first isolated conductive structure may affect a conductivity of a first transistor.

The first isolated conductive layer may be a single polysilicon layer.

Step 120 may include converting, by a second group of radiation sensing diodes that are coupled to each other, sensed radiation that is sensed by the second group to a second output signal.

Step 120 may be followed by step 124 of changing a state of, under a control of the first transistor, a second isolated conductive structure using the second output signal. The second isolated conductive structure may include a floating gate of a second transistor.

Step 124 may include preventing, by the first transistor, the second isolated conductive structure to reach a saturation level.

Steps 110 and 120 may include receiving by the first group of radiation sensing diodes a larger dose of radiation in relation to the second group of radiation sensing diodes.

Method 100 may also include step 130 of preventing, by a blocking element, the radiation from impinging on the first transistor.

Any reference to any of the terms "comprise", "comprises", "comprising" "including", "may include" and "includes" may be applied to any of the terms "consists", "consisting", "consisting essentially of". For example—any of the rectifying circuits illustrated in any figure may include more components that those illustrated in the figure, only the components illustrated in the figure or substantially only the components illustrated in the figure.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A radiation sensor, comprising:
   a first transistor;
   a first isolated conductive structure that comprises a floating gate of the first transistor;
   a first group of radiation sensing diodes that are coupled to each other, wherein the first group is configured to convert sensed radiation that is sensed by the first group to a first output signal, and to change a state of the first isolated conductive structure using the first output signal;
   a second transistor;
   a second isolated conductive structure that comprises a floating gate of the second transistor; and
   a second group of radiation sensing diodes that are coupled to each other, wherein the second group is configured to convert sensed radiation that is sensed by the second group to a second output signal, and to change a state, under a control of the first transistor, of the second isolated conductive structure using the second output signal.

2. The radiation sensor according to claim 1 wherein the first transistor is configured to prevent the second isolated conductive structure to reach a saturation level.

3. The radiation sensor according to claim 1 wherein the first group of radiation sensing diodes are configured to receive a larger dose of radiation in relation to the second group of radiation sensing diodes.

4. The radiation sensor according to claim 1 comprising a blocking element for preventing the radiation from impinging on the first transistor.

5. The radiation sensor according to claim 1 wherein the first isolated conductive structure further comprises a first plate of a first control capacitor; and wherein the second isolated conductive structure further comprises a first plate of a second control capacitor.

6. The radiation sensor according to claim 5 wherein the first group of radiation sensing diodes and the second group of radiation sensing diodes are formed in a device layer; wherein the device layer comprises a second plate of the first control capacitor, and a second plate of the second control capacitor.

7. The radiation sensor according to claim 1 wherein the first transistor is serially coupled to the second group of radiation sensing diodes.

8. The radiation sensor according to claim 1 wherein the first group of radiation sensing diodes are serially connected radiation sensing diodes of alternating polarities, some of which are preceded by radiation shields.

9. The radiation sensor according to claim 8 wherein the first group of radiation sensing diodes comprises of multiple sequences of (a) a P+ doped region, (b) an intrinsic region, and (c) an N+ doped region.

10. The radiation sensor according to claim 1 wherein the first group of radiation sensing diodes and the second group of radiation sensing diodes are configured to sense ultraviolet radiation.

11. The radiation sensor according to claim 1 wherein the first group of radiation sensing diodes and the second group of radiation sensing diodes are configured to sense infrared radiation.

12. The radiation sensor according to claim 1 wherein the first group of radiation sensing diodes and the second group of radiation sensing diodes are configured to sense x-ray radiation.

13. The radiation sensor according to claim 1 wherein the first group of radiation sensing diodes and the second group of radiation sensing diodes are located at a certain layer of the radiation sensor; wherein the first isolated conductive structure and the second isolated conductive structure are located at another layer of the radiation sensor.

14. The radiation sensor according to claim 1 wherein the first isolated conductive layer is a single polysilicon layer.

15. The radiation sensor of claim 1 where the first group of radiation sensing diode are formed in a single polysilicon layer.

16. The radiation sensor according to claim 1 wherein the radiation sensor comprises multiple instances of the first transistor, the first isolated conductive structure, the first group of radiation sensing diodes, the second transistor, the second isolated conductive structure, and the second group of radiation sensing diodes.

17. A method for sensing radiation, the method comprises:
   converting, by a first group of radiation sensing diodes that are coupled to each other, sensed radiation that is sensed by the first group to a first output signal;
   changing a state of a first isolated conductive structure using the first output signal; wherein the first isolated conductive structure comprises a floating gate of a first transistor;
   converting, by a second group of radiation sensing diodes that are coupled to each other, sensed radiation that is sensed by the second group to a second output signal; and
   changing a state, under a control of the first transistor, of a second isolated conductive structure using the second output signal; wherein the second isolated conductive structure comprises a floating gate of a second transistor.

18. The method according to claim 17 comprising preventing, by the first transistor, the second isolated conductive structure to reach a saturation level.

19. The method according to claim 17 comprising receiving by the first group of radiation sensing diodes a larger dose of radiation in relation to the second group of radiation sensing diodes.

20. The method according to claim 17 comprising preventing, by a blocking element, the radiation from impinging on the first transistor.

21. The method according to claim 17 wherein the first isolated conductive layer is a single poly silicon layer.

22. A radiation sensor, comprising:
a first layer that comprises a first isolated conductive structure that is a single polysilicon layer, the first isolated conductive structure comprises a floating gate of the first transistor;
a first insulating layer;
a silicon layer that comprises (a) a first group of radiation sensing diodes that are coupled to each other, wherein the first group is configured to convert sensed radiation that is sensed by the first group to a first output signal, and to change a state of the first isolated conductive structure using the first output signal; wherein the first insulating layer is positioned between the first layer and the silicon layer;
an oxide layer; and
a silicon substrate; wherein the oxide layer is positioned between the silicon layer and the silicon substrate.

* * * * *